United States Patent Office 3,637,606
Patented Jan. 25, 1972

3,637,606
PROCESS FOR CHAIN TERMINATING POLY-(1,4-AMINO BENZOIC ACID)
Paul W. Morgan, West Chester, Pa., assignor to E. I. du Pont de Nemours and Company, Wilmington, Del.
No Drawing. Filed Jan. 22, 1969, Ser. No. 793,175
Int. Cl. C08g 20/04
U.S. Cl. 260—78 A
5 Claims

ABSTRACT OF THE DISCLOSURE

A process for chain terminating poly(1,4-benzamide) by using a preferred class of aromatic amino, hydrazino, and hydrazido carboxylic acids and derivatives, p-aminobenzoic acid being most preferred. An improved means of polymer stabilization is provided which permits the polymers, in the form of shaped articles, to undergo both a desirable increase in molecular weight and enhancement of physical properties.

This invention relates to a process for chain terminating poly(1,4-benzamide) for preparing shaped articles (e.g., fibers) exhibiting superior properties from these polymers.

BACKGROUND OF THE INVENTION

The use of certain chemicals or additives known as chain terminators or viscosity stabilizers is a well-known practice in the preparation of synthetic polymers. For example, in a solution polymerization, the use of very pure monomer may undesirably result in the molecular weight of the polymer increasing to a point beyond the solubility limit of the polymer in the solvent. Although the use of impure monomer or solvent, side reactions, etc., may provide a type of molecular weight control, a chain terminator is generally used because it provides greater certainty of control.

The present invention provides not only an improved means for stabilizing the viscosity of poly(1,4-benzamide) during its preparation, but one which permits this material in the form of shaped articles to undergo both a desirable increase in molecular weight (as evidenced by a rise in inherent viscosity) and enhancement of the physical properties (e.g., tenacity and initial modulus of fibers) of the shaped articles.

SUMMARY OF THE INVENTION

This invention provides improved processes for chain terminating poly(1,4-benzamide). As used herein, "poly-(1,4-benzamide)" includes homo- and copolymers containing at least about 80 mol percent of recurring units of the formula (I)

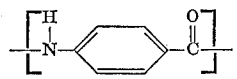

with the remaining recurring units, if any, as set forth hereinafter. The improvement provided by this invention comprises chain terminating the polymers with at least one compound of the formula (II)
$$H_2N-R-\overset{O}{\underset{\|}{C}}-OR'$$

wherein R is a divalent radical comprised of from 6–20 carbon atoms, containing at least one phenylene ring which may bear one or more substituents non-reactive in the polymerization and where R' is selected from the group of hydrogen, lower alkyl radicals, and aryl radicals which may bear substituents non-reactive in the polymerization. The chain terminator compound (or compounds) is added during the polymer preparation, i.e., it may be added at the start of the polymerization (i.e., to the unreacted monomer, solvent, etc.) or during the polymerization (i.e., to the polymerization reaction medium).

The chain-terminated polyamides may be obtained from suitable monomers and comonomers by low temperature solution polymerization techniques. The chain-terminated products may be combined with a suitable medium or media to form dopes (fiber-forming extrudable polymer-solvent systems which may comprise more than one phase) which may be shaped into useful articles such as fibers and films. If desired, depending upon the polymerization medium chosen, the terminated polymers may be directly shaped from the reaction mixture into useful articles, without isolating them in bulk form.

This invention further provides processes for preparing shaped articles (e.g., fibers and films) having superior properties from these chain terminated polyamides. Such products undergo enhancement in their physical properties by post-preparative heat treatment processes which produce a concomitant increase in inherent viscosities of the articles. This increase in inherent viscosity which is preferably achieved by subjecting the shaped article to a heat treatment, is accompanied by an unexpected enhancement of the physical properties of the shaped article, as is illustrated in subsequent examples. In addition, by assisting in the control of the molecular weight of the polyamide, the Formula II chain terminator contributes to the ease by which useful dopes of the polymer may be obtained and enhances the stability of the polymer dope for application in, e.g., coupled polymerization-fiber spinning processes.

DESCRIPTION OF THE PREFERRED EMBODIMENTS

Chain terminators

The chain terminators useful in this invention are aromatic amino, hydrazino, and hydrazido carboxylic acids and derivatives thereof corresponding to the formula (II)    $H_2N-R-COOR'$ wherein R and R' are as defined above. The chain extending bonds of the phenylene ring of R are preferably meta- or para-oriented; both orientations may be present when more than one ring is present. The phenylene ring in R in Formula II is preferably attached to the carboxyl group in Formula II through a valence bond (e.g., p-aminobenzoic acid) or through a linking member selected from the group consisting of (—CH$_2$—)$_{1\ to\ 3}$ (e.g., 4-aminophenylacetic acid) —S—(CH$_2$—)$_{1\ to\ 3}$ (e.g., 4-aminothiophenoxy acetic acid), —O—(CH$_2$—)$_{1\ to\ 3}$ (e.g., 4-aminophenoxy butyric acid),

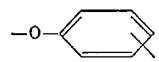

[e.g., 4-(4-aminophenoxy)benzoic acid],

—CONH—CH$_2$—

(e.g., 4-aminohippuric acid),

(e.g., 4-aminocinnamic acid),

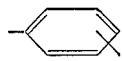

[e.g., 4-(4-aminophenyl) benzoic acid],

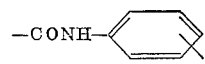

[e.g., 4-(4-aminobenzamido) benzoic acid],

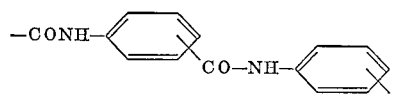

(e.g., 4-[3-(4-aminobenzamido) benzamido] benzoic acid),

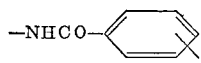

(e.g., 4'-amino-4-carboxybenzanilide)

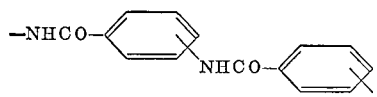

(e.g., 4'-[(4-aminophenyl) carbamoyl]-4-carboxybenzanilide),

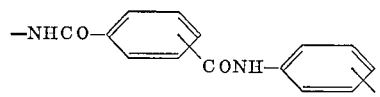

(e.g., 4'-[(4-aminophenyl carbamoyl]-4-carboxybenzanilide, and

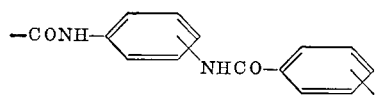

wherein each of the phenylene radicals

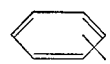

above may suitably be meta- or para-oriented. The phenylene ring in R in Formula II is preferably attached to the amino group in Formula II through a valence bond (e.g., m-aminobenzoic acid) or through a linking member selected from the group consisting of —NH— (e.g., 4-hydrazinobenzoic acid) and —NHCO— (e.g., terephthaloyl monohydrazide).

The "substituents non-reactive in the polymerization" which may be attached to the phenylene ring in the radicals of R' in Formula II are preferably selected from the group consisting of Cl, F, Br, NO$_2$, CH$_3$O, C$_2$H$_5$O, 1–5 carbon alkyl (e.g., tert. butyl, isoamyl, methyl and ethyl) and COOH. Similar substituents non-reactive in the polymerization may be attached to the phenylene ring or rings in R in Formula II with the proviso that at least one position ortho to the amino group be unsubstituted and that alkyl substituents on the substituted ortho position, if any, be CH$_3$ or C$_2$H$_5$.

Among the preferred Formula II terminators may be named 4-aminobenzoic acid (i.e., p-aminobenzoic acid, or dracilic acid), 4-amino-2-chlorobenzoic acid, 4-(4'-aminophenyl)benzoic acid, 4-aminophenylacetic acid, 4-amino-thiophenoxyacetic acid, α-(4-aminophenyl)isobutyric acid, 4-aminohippuric acid, 3-aminobenzoic acid, 4-(4-aminobenzamido)benzoic acid, 4-(3-aminobenzamido)benzoic acid, 3-(4-aminobenzamido)benzoic acid, 4-hydrazinobenzoic acid, methyl 4-aminobenzoate, phenyl 4-aminobenzoate, 4-amino-3-methylbenzoic acid, 4-(4-aminophenoxy)benzoic acid, 4'-chlorophenyl 4-aminobenzoate, 4-[3-(4-aminobenzamido)benzamido]benzoic acid, 5-aminoisophthalic acid, 4-amino-o-phthalic acid, and terephthaloyl monohydrazide.

A molecular quantity of 0.1 to 3.0%, commonly 0.5 to 2% (based on the mole(s) of monomeric precursors from which the polyamide or copolyamide is made), of Formula II terminator(s) is employed in this invention, depending on the system being terminated and on the polymerization medium utilized. The terminator may be present at the start of the polymerization or may be added during the polymerization to provide the desired degree of molecular weight control. Larger amounts may be needed as the time of addition is delayed.

POLYMER PREPARATION

The essentially homopolymeric poly(1,4-benzamide) comprising repeating units of the formula (I)

which is chain terminated with one or more Formula II terminators may be obtained by the low temperature solution polymerization of p-aminobenzoyl halide salts of the formula (III)

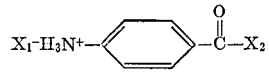

wherein X$_1$ represents a member selected from the group consisting of arylsulfonate, alkylsulfonate, acid sulfate, and halogen radicals, preferably bromide or chloride radicals, and X$_2$ represents a halogen radical preferably bromide or chloride. p-Aminobenzoyl chloride hydrochloride is the monomer preferred. Other monomers suitable for this purpose are p-aminobenzoyl bromide hydrobromide, p-aminobenzoyl chloride hydrobromide, p-aminobenzoyl chloride methanesulfonate, p-aminobenzoyl chloride benzenesulfonate, p-aminobenzoyl chloride toluenesulfonate, p-aminobenzoyl bromide ethanesulfonate, and p-aminobenzoyl chloride acid sulfate. Other monomers not within Formula III, e.g., p-aminobenzoyl chloride sulfate are also suitable. The preferred p-aminobenzoyl chloride hydrochloride may be prepared in high yield from an ethereal solution of p-thionylaminobenzoyl chloride by the general procedure of Graf and Langer, J. prakt. Chem. 148, 161 (1937) under anhydrous conditions. The drying and anhydrous storage of this monomer are preferably performed under room temperature conditions because of the tendency for the compound to polymerize at higher temperatures.

Poly(1,4-benzamide) copolymers chain terminated with one or more Formula II terminators may be obtained by similar techniques, consisting essentially of recurring units of the formulae

A

and

B

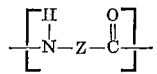

wherein Z represents a divalent organic radical and preferably has the significance set forth below, the A units constitute at least about 80 mol percent and the B units constitute up to about 20 mol percent in the process of this invention. The copolyamides may be derived from a major portion of a Formula III salt copolymerized with a minor portion of at least one salt selected from the class represented by the formula (IV)

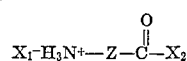

wherein X$_1$ and X$_2$ have the significance set forth hereinabove, and wherein Z represents a m-phenylene radical or a member of the group consisting of m-phenylene and p-phenylene radicals which bear one or more substituents (the same or different) selected from the group of halogen, lower alkyl, lower alkoxy, isopropenyl, methylthio, ethylthio, cyano, nitro, acetyl, carbomethoxy, carboethoxy, acetamido, dimethylamino, diethylamino, ethylsulfonyl, dimethylcarbamoyl, diethylcarbamoyl, methylsulfonyl, dimethylsulfamoyl, diethylsulfamoyl, and fluorosulfonyl radicals, or a structure of the type

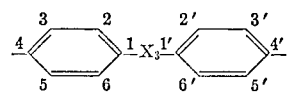

which may bear one or more substituents selected from the group of halogen, lower alkyl, and lower alkoxy radicals and where the terminal bonds are attached to 3, 4 or 5 and 3′, 4′, or 5′ positions and wherein $X_3$ is a single bond,

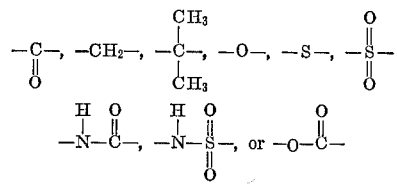

Formula IV comonomers preferred for the preparation of the copolyamides include m-aminobenzoyl chloride hydrochloride, m-aminobenzoyl bromide hydrobromide, 2 - methyl - 3 - aminobenzoyl chloride hydrochloride, p-aminophenyl p-(chlorocarbonyl)-phenyl sulfone hydrochloride, p-aminophenyl p-(chlorocarbonyl) phenyl ether hydrochloride, p-amino- p′-(chlorocarbonyl biphenyl hydrochloride, m-amino-p′-(chloro-carbonyl) benzophenone hydrochloride, p-(chlorocarbonyl)phenyl-p′-aminobenzoate hydrochloride, 3-fluoro-4-aminobenzoyl chloride hydrochloride 2-chloro-4-aminobenzoyl chloride hydrochloride
2,6-dichloro-4-aminobenzoyl chloride hydrochloride
3-bromo- 4-aminobenzoyl chloride hydrochloride
2,6-dibromo-4-aminobenzoyl chloride hydrochloride
3-iodo-4-aminobenzoyl chloride hydrochloride
2-fluoro-4-aminobenzoyl chloride hydrochloride
2,3-dimethyl-4-aminobenzoyl chloride hydrochloride
2,6-dimethyl-4-aminobenzoyl chloride hydrochloride
3-ethyl-4-aminobenzoyl chloride hydrochloride
2-nitro-4-aminobenzoyl chloride hydrochloride
3-ethoxy-4-aminobenzoyl chloride hydrochloride
2-ethoxy-5-nitro-4-aminobenzoyl chloride hydrochloride
2-propoxy-4-aminobenzoyl chloride hydrochloride
2-isobutoxy-4-aminobenzoyl chloride hydrochloride
2-sec.butoxy-4-aminobenzoyl chloride hydrochloride
3-propoxy-4-aminobenzoyl chloride hydrochloride
3-isopropoxy-4-aminobenzoyl chloride hydrochloride
3-butoxy-4-aminobenzoyl chloride hydrochloride
2-methylthio-4-aminobenzoyl chloride hydrochloride
2-ethylthio-4-aminobenzoyl chloride hydrochloride
2,5-dimethyl-4-aminobenzoyl chloride hydrochloride
3,5-dimethyl-4-aminobenzoyl chloride hydrochloride
2-ethylsulfonyl-4-aminobenzoyl chloride hydrochloride
2-dimethylsulfamoyl-4-aminobenzoyl chloride hydrochloride
2,3,5,6-tetramethyl-4-aminobenzoyl chloride hydrochloride
4-methyl-3-aminobenzoyl chloride hydrochloride
4-ethyl-3-aminobenzoyl chloride hydrochloride
4-isopropyl-3-aminobenzoyl chloride hydrochloride
4-isopropenyl-3-aminobenzoyl chloride hydrochloride
4-tert.butyl-3-aminobenzoyl chloride hydrochloride
2,6-dimethyl-3-aminobenzoyl chloride hydrochloride
2-chloro-3-aminobenzoyl chloride hydrochloride
4-chloro-3-aminobenzoyl chloride hydrochloride
5-bromo-3-aminobenzoyl chloride hydrochloride
2-iodo-3-aminobenzoyl chloride hydrochloride
2,5-dichloro-3-aminobenzoyl chloride hydrochloride
4,6-dichloro-3-aminobenzoyl chloride hydrochloride
5-nitro-3-aminobenzoyl chloride hydrochloride
4-dimethylamino-3-aminobenzoyl chloride hydrochloride
2-butoxy-3-aminobenzoyl chloride hydrochloride
2-isopropoxy-3-aminobenzoyl chloride hydrochloride
4-propoxy-3-aminobenzoyl chloride hydrochloride
2-acetyl-3-aminobenzoyl chloride hydrochloride
4-methylthio-3-aminobenzoyl chloride hydrochloride
4-ethylthio-3-aminobenzoyl chloride hydrochloride Other poly(1,4-benzamide) copolymers, chain terminated with one or more Formula II terminators, may also be obtained by similar techniques, consisting essentially of recurring units of the formula A 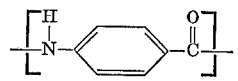

and

AA 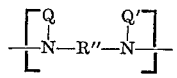

and

BB 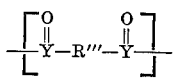

and is also useful in the process of this invention; R″ and R‴ may represent the same or different divalent organic radicals; in addition, R″ may represent a single bond; Q and Q′ are selected from the group of a hydrogen atom and methyl and phenyl radicals; Y and Y′ are selected from the group of

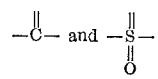

the A units constitute at least about 80 mole percent of the copolymer and the AA and BB units in substantially equimolar amounts constituting up to about 10 mole percent each. The copolyamides may be derived from a major portion of a Formula III salt copolymerized with a minor portion of stoichiometrically equivalent amounts of the appropriate AA and BB intermediates. As suitable AA intermediates there may be mentioned aromatic diamines and tetraamines such as p-phenylenediamine, m-phenylenediamine, benzidine, 4,4′-diaminodiphenylmethane, 4,4′ - diaminodiphenylketone, 4,4′ - diaminodiphenylsulfide, 4,4′ - diaminodiphenylsulfone, 4,4′ - diaminodiphenyl ether, 4,4′ - diaminodiphenyl - 1,2 - ethane, 4,4′ - diaminodiphenyl - 2,2 - propane, 4 - methyl-m-phenylenediamine, 2,6 - dichloro-p-phenylenediamine, 3,3′ - dichlorobenzidine, 4 - (4′ - aminobenzamido)-aniline, 3,3′ - diaminobenzidine, 1,2,4,5 - tetraminobenzene, and 3,3′ - dihydroxybenzidine; dihydrazides such as oxalyl, isophthaloyl, terephthaloyl, bibenzoyl, adipyl, carbonyl, 2,5 - pyridinedicarboxylic dihydrazide; and hydrazines such as hydrazine, methylhydrazine, phenylhydrazine, N,N′ - diaminopiperazine, N,N′ - diamino-trans-2,5 - dimethylpiperazine, N,N′ - diamino - 4,4′ - dipiperidyl. As suitable BB intermediates there may be mentioned diacid halides and disulfonyl chlorides such as adipyl chloride, sebacyl chloride, cyclohexane - 1,4-dicarbonyl chloride, 1,4 - phenylenediacetyl chloride, cyclobutane - 1,3 - dicarbonyl chloride, terephthaloyl chloride, terephthaloyl bromide, isophthaloyl chloride, 2,5 - dichloroterephthaloyl chloride, 5 - chloroisophthaloyl chloride, 5 - tertiarybutylisophthaloyl chloride, bibenzoyl chloride, diphenic acid chloride, sulfonyl dibenzoyl chloride, 2,6 - naphthalenedicarbonyl chloride, 1,4 - naphthalenedicarbonyl chloride, 2,6 - pyridinedicarbonyl chloride, m-benzenedisulfonyl chloride, p-benzene-disulfonyl chloride, 1,5 - naphthalenedisulfonyl-chloride, 4,4′ - biphenyldisulfonyl chloride, oxy bis(4-benzenesulfonyl chloride), methylene bis(4 - benzenesulfonyl chloride), N,N′ - carbonyldisulfanilyl chloride, 4,5-dichloro - 1,3 - benzenedisulfonyl chloride, 1,6 - hexanedisulfonyl chloride, 4 - chlorocarbonylbenzenesulfonyl chloride; bisanhydrides such as pyromellitic dianhydride, cyclobutanetetracarboxylic acid dianhydride, naphthalene - 1,4,5,8 - tetracarboxylic dianhydride, methylene bis(4 - phthalic anhydride); and isocyanates such as hexamethylene diisocyanate, 1,4-phenylene diisocyanate, 1,3 - phenylene diisocyanate, 4 - methyl - 1,3 - phenylene diisocyanate, 4,4' - biphenylene diisocyanate, bis(4-isocyanatophenyl)methane, bis(4 - isocyanatophenyl) sulfone, 3,3' - dimethyl - 4,4' - biphenylene diisocyanate, 3,3' - dichloro - 4,4'-biphenylene diisocyanate, 1,4-cyclohexylene diisocyanate, 1,2 - bis(4 - isocyanatophenyl) ethane, 4 - isocyanatobenzoyl chloride, 4 - isocyanatobenzenesulfonyl chloride.

POLYMERIZATION CONDITIONS

The low temperature, i.e., under 60° C. and preferably from 0°-20° C., solution polymerizations which provide the chain terminated polyamides useful in the process of this invention preferably employ a solvent selected from the group consisting of N,N,N',N' - tetramethylurea, hexamethylphosphoramide, N,N - dimethylacetamide, and N - methylpyrrolidone - 2. Other useful polymerization media are N-methylpiperidone-2, N,N'-dimethylethyleneurea, N,N' - dimethylpropylene urea, N,N,N',N' - tetramethylmalonamide, N - methylcaprolactam, N - acetylpyrrolidine, N,N - diethylacetamide, N - ethylpyrrolidone - 2, N,N - dimethylpropionamide, N,N - dimethylbutyramide and N,N - dimethylisobutyramide. Certain combinations of these solvents are useful, also (e.g., N,N - dimethylacetamide/N - methylpyrrolidone-2, 50/50 v./v.

Choice of a particular polymerization medium for copolymer preparation may depend in part on the particular AA–BB combination contemplated. In general, if the homopolymeric poly(1,4 - benzamide) and the polymer from the AA–BB reactants can be made separately in the particular system, then a useful degree of copolymerization can also be achieved.

A salt selected from the group of lithium chloride (preferred) and calcium chloride is advantageously present in the polymerization mixture since the salt may assist in maintaining a fluid, stirrable, mixture during polymerization. The salt may be added at the beginning of the polymerization or during its course. The salt concentration affects the maximum solids content. At least about 2.5 weight percent (based on combined weight of all ingredients) of salt is suitable. For the preparation of dopes by dissolution of isolated polymer, as well as for the preparation of dopes by in situ polymer formation, a lithium chloride range of about 4 to about 7 weight percent being most preferred (from about 5 to about 8 weight percent is most preferred for calcium chloride). When, with proper choice of monomer or comonomers used in the polymerization, hydrogen chloride is generated as a by-product of the polymerization reaction, the salt may also be provided by forming it in situ by neutralizing the hydrogen chloride with a base selected from the group consisting of lithium carbonate, lithium oxide, lithium hydroxide (includes monohydrate), calcium oxide, calcium hydroxide, lithium hydride, and calcium hydride or mixtures thereof. The base is preferably added within 2 hours after the polymerization is initiated. Neutralization is especially preferred in embodiments hereinafter described wherein the reaction mixture is utilized directly for forming shaped articles of the polymer. It will be understood that unneutralized hydrogen chloride may cause significant corrosion problems in processing equipment (e.g., spinnerets used for fiber preparation).

If the choice of monomer or comonomers does not lead to the production of hydrogen chloride during the polymerization reaction, the acidic by-product of the polymerization may still be neutralized with the aforementioned bases, and the desired lithium or calcium chloride added directly to the polymerization mixture to assist in maintaining a fluid composition. Under the polymerization conditions useful in obtaining the chain-terminated polymers described herein, the neutralization of the reaction mixture with a lithium or calcium base may produce an insoluble salt in the reaction mixture. For example, if p-aminobenzoyl chloride acid sulfate is the Formula III monomer used for preparing poly(1,4-benzamide) and if calcium hydroxide is used to neutralize the reaction mixture, an insoluble precipitate of calcium sulfate forms. This and other insoluble precipitates which may result by virtue of the choice of monomer, comonomers, amide medium, and neutralizing agent should be removed (e.g., by filtration) before the polymerization mixture is, e.g. extruded into fiber or cast into films.

The above-mentioned polymerizations may be carried out by dissolving the Formula II teminator and appropriate monomer or comonomers, together with lithium chloride or calcium chloride, in the amide solvent and vigorously stirring the resulting combination, externally cooled, until the desired degree of polymerization (as evidenced by inherent viscosity measurements) is achieved, using a base to neutralize the acidic by-product, if desired. The polyamide may then be precipitated by the addition of a nonsolvent, e.g., water. Alternatively, the monomer or comonomers may first be slurried in a small quantity of an inert organic liquid prior to the addition of the amide solvent containing the terminator. In a variation of the former method, the solvent-terminator combination may be frozen and mixed, while frozen, with the desired monomer or comonomers. The solvent is permitted to thaw and the resulting system stirred until the desired degree of polymerization is reached. These polymerizations are preferably performed under strictly anhydrous conditions. The reaction vessel and auxiliary equipment, solvents, and reactants are carefully dried prior to use and the reaction vessel is continuously swept with a stream of dry, inert gas, e.g., nitrogen, during the polymerization.

One such polymerization may be accomplished by first adding, with stirring a quantity of an anhydrous organic liquid, such as tetrahydrofuran, dioxane, benzene, or acetonitrile, to a quantity of the desired monomer in the gas-swept polymerization apparatus. This liquid also contains the calculated amount of the desired chain-terminating agent, e.g., p-aminobenzoic acid. The resulting mixture is stirred at an increased rate and a relatively large volume of anhydrous amide solvent, e.g. N,N,N',N'-tetramethylurea, N,N-dimethylacetamide, or N-methylpyrrolidone, is then rapidly added to the flask. The resulting solution, externally cooled, is stirred continuously until there is a substantial increase in the viscosity of the composition. The latter may, if desired, stand overnight or longer at room temperature. To isolate the polymer in bulk form, the polymerization mixture is combined with water in a suitable blender to precipitate the polymer which is then converted to a fine powder. The powdered polymer, after being washed, e.g., with both water and alcohol, may be dried overnight in a vacuum oven at about 80°-90° C. before being stored or subsequently processed.

DOPE PREPARATION

As previously noted, shaped articles such as fibers and films may be formed directly from neutralized reaction mixtures comprising chain-terminated polyamides and copolyamides described herein. Especially preferred for such in situ preparation and shaped article formation is poly (1,4-benzamide) which is chain-terminated with p-aminobenzoic acid. The preferred Formula III monomer for this polymerization is p-aminobenzoyl chloride hydrochloride and the preferred polymerization medium is an amide selected from the group of N,N,N',N'-tetramethylurea; N,N-dimethylacetamide; N,N-dimethylisobutyramide; N-methylpyrrolidone-2; and N,N'-dimethylethylene urea. Use of one of the previously cited lithium bases (e.g., lithium carbonate) for neutralization is preferred.

The chain-terminated polyamides and copolyamides which are isolated in bulk form may be converted into shaped articles by first incorporating them in dopes which are then extruded into fibers, cast into films, etc. These dopes are essentially comprised of at least about 4% by weight of the polyamide or copolyamide, the amide medium, and lithium chloride or calcium chloride. Significant variables in dope preparation are polymer inherent viscosity, polymer crystallinity, polymer particle size, type of amide medium, type of salt, salt concentration, and dope preparation technique. In general, the maximum polymer content possible in the dope decreases as the inherent viscosity of the polyamide or copolyamide increases; preferably, isolated bulk polymer is finely divided (e.g., comminuted by ball milling) prior to combining it with the amide medium and the salt. Dopes may contain from about 4 to about 25 weight percent of polyamide or copolyamide, at least about 2.5 weight percent of salt (a lithium chloride range from about 4 to about 7% is preferred and about 5 to 8% by weight for calcium chloride), and the balance is one or more appropriate amides. Salt in excess of about 20 weight percent is generally neither necessary nor desired; less than 15 weight percent of salt is preferred. Amides useful for preparing dopes containing calcium chloride include N,N-dimethylacetamide, N,N-diethylacetamide, N-methylpyrrolidone - 2, N-methylpiperidone - 2, N-ethylpyrrolidone - 2, N-methylcaprolactam, N-acetylpyrrolidine, N-acetylpiperidine, N,N'-dimethylethyleneurea, and N,N'-dimethylpropyleneurea. In addition to the above-cited amides, amides useful for preparing dopes containing lithium chloride also include N,N-dimethylpropionamide, N,N-dimethylbutyramide, N,N-dimethylisobutyramide, and N,N-dimethylmethoxyacetamide.

Useful dopes comprising the chain-terminated polyamides and copolyamides described above, lithium, or calcium chloride, and one or more of the above-cited amides may be prepared in a variety of ways. Dopes useful for spinning into fibers may be prepared at room temperature conditions; other dopes require specific heating techniques. Clear flowable compositions may be obtained at room temperature in some instances while heating preferably with stirring, and sometimes heating and cooling cycles are required in other instances. The amount of heating and/or cooling required to form by this method a composition with the flow characteristic needed for smooth spining of fibers varies with the inherent viscosity, the crystallinity, and the particle size of the polyamide sample employed, as well as with the quality of the stirring action.

One such dope preparation technique comprises heating the polymer, amide, and salt mixture, preferably with stirring, to about 100–110° C. and maintaining the mixture thereat for from 10 minutes to 24 hours, preferably 30–60 minutes, to form a clear flowable composition.

Another technique comprises stirring the mixture at autogenous temperature until gelation occurs. The gelled mass may then be heated to from about 80–110° C. for from 1 to 24 hours to produce a spinnable or castable composition. After the ingredients are so heated, it may be necessary to then freeze them (e.g., by freezing them in a mixture of solid carbon dioxide and acetone) for up to about 2 hours, after which the frozen mass is permitted to melt or partially melt. The ingredients are then heated as described above. One cooling and one heating treatment, above-described, constitute a "cycle"; up to as many as 6 cycles may be necessary to produce a spinnable, free-flowing dope under the conditions previously described. The combined ingredients may also be heated (as above) immediately after mixing, then cooled and further heated, etc., as required to affect dope formation. Conversely the ingredients may be cooled first, then heated, then followed by further cooling and heating, if necessary, to prepare the desired composition.

SHAPED ARTICLE PREPARATION

Dopes prepared as described above may be extruded into fibers by conventional wet- and dry-spinning techniques and equipment. In wet-spinning, an appropriately prepared composition, containing the polymer or copolymer, whose temperature may vary from 20 to about 100° C., is extruded into a suitable coagulating bath, e.g., a water bath maintained at 65–90° C. Other useful coagulants include ethylene glycol, glycerol, mixtures of water and alcohol, and aqueous salt baths. Dry spinning may be accomplished by extruding the dope, preferably maintained at about 85–125° C., into a heated current of gas whereby evaporation occurs and fibers are formed.

After being formed, the fibers may be passed over a finish-application roll and wound up on bobbin. Development of maximum levels of fiber and yarn properties is assisted by soaking the bobbins in water or mixtures of water and water-miscible inert organic liquids (e.g., acetone, ethyl alcohol, glycerol, N,N-dimethylacetamide, N,N,N',N'-tetramethylurea) to remove residual amide liquid and salt, after which the fibers are dried. Removal of the salt and amide liquid may also be accomplished by passing the fiber or yarn through aqueous baths on the run, by flushing the bobbins with water as the yarn is formed, and by soaking or washing skeins, rather than bobbins of yarn.

The dopes comprising the chain terminated polyamide and copolyamide described above may be formed into strong self-supporting films by conventional wet-extrusion methods. Such films are usually kept under restraint when they are subsequently dried and washed.

VISCOSITY INCREASE AND PROPERTY IMPROVEMENT IN SHAPED ARTICLES

The properties of shaped articles prepared from the above-described terminated polyamides and copolyamides are enhanced by post-preparative heat treatment. For example, the inherent viscosity and the as-extruded tensile properties of both the wet- and dry-spun polyamide and copolyamide fibers can be increased by subjecting the fibers to a heat treatment wherein the fibers are kept under tension or are drawn slightly. Drawing may vary from essentially none to as much as 25%, depending on fiber history and composition. Hot air ovens, hot pins, hot slots, hot plates, and liquid heating baths are useful for such treatments. The tensile properties of as-extruded fibers are preferably enhanced by heating the fibers, maintained in a taut state or drawn slightly at about 300–1000° C., preferably 500–600° C., for from 5 min.–0.1 seconds, preferably 10–0.1 seconds, and preferably in a nitrogen atmosphere. Examination of Table II herein reveals that a fiber sample of poly(1,4-benzamide) terminated with p-aminobenzoic acid and heat treated exhibits properties vastly superior to those of a fiber from a polymer terminated with aniline and benzoyl chloride. The same improvements in inherent viscosity and tensile properties are exhibited by poly(1,4-benzamide) films similarly terminated.

MEASUREMENTS AND TESTS

Inherent viscosity.—Inherent viscosity ($\eta_{inh}$) is defined by the following equation:

$$\eta_{inh} = \frac{\ln(\eta_{rel})}{C}$$

wherein ($\eta_{rel}$) represents the relative viscosity and (C) represents a concentration of 0.5 gram of the polymer in 100 ml. of solvent, unless otherwise noted. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C., using concentrated (95–98%) sulfuric acid as a solvent.

Tensile Properties.—Fiber properties of tenacity, elongation, and initial modulus are coded at T/E/Mi and are reported in their conventional units. Denier is coded as Den. The boiling off treatment of fibers prior to physical testing consists of boiling the fibers 30 minutes in 0.1% aqueous sodium lauryl sulfate, rinsing, drying at 40° C. for 1 hour, and conditioning at 21° C. and 65% r.h. for 16 hours. Tensile properties are determined on fiber samples, measuring one inch (2.54 cm.) in length between the jaws of an Instron tester (product of the Instron Engineering Corp., Canton, Mass.) and which are subjected therein to a load sufficient to cause elongation to occur at the rate of 10% per minute measured at 21° C. and 65% r.h.

Heat treatment.—Unless otherwise stated in the following examples, the post-extrusion heat treatment applied to the fibers and yarns of this invention comprises washing or soaking the as-extruded fiber or yarn in 3 changes of distilled water until essentially free of amide or urea media and salt, drying them, then heating them by passing them through a hot stainless steel tube, 0.286 inch (7.26 mm.) inside diameter and 32 inch (81.3 cm.) in length, at 12 ft./min. (3.66 m./min.) under a nitrogen atmosphere with no or a small increase in their length. Preheated nitrogen passes through a small hole at the center of the tube and thence outward to both ends of the tube at such a rate as to change the amosphere in the tube at least once every minute. The tube is mounted in a concentric stainless steel tube of about 1.06 inch outside diameter through which the nitrogen passes and is heated on its way to the hole in the smaller tube. The tube system is heated about the center by a 12-inch electric furnace which is controlled by a thermocouple brazed to the external central surface of the outer tube and connected to a Minneapolis-Honeywell "Pyrovane" controller. The nominal heat-treating temperature is determined by a thermocouple brazed to the outer central surface of the inner tube.

EXAMPLES

The following nonlimiting examples are illustrative of the practice of the invention. Parts and percentages are by weight unless otherwise indicated.

EXAMPLE I

This example illustrates the preparation of two spinning dopes comprising poly(1,4-benzamide); one polymer sample is terminated with p-aminobenzoic acid and the other with a combination of aniline and benzoyl chloride. Equivalent procedures are used in these preparations.

Part A

Dry N,N,N',N'-tetramethylurea (TMU) (400 ml.) and 0.74 g. (0.0054 mole) of p-aminobenzoic acid are placed in a 1 quart (0.946 l.) resin kettle equipped with a high speed stirrer. This system is cooled with solid carbon dioxide and 64.0 g. (0.33 mole) of p-aminobenzoyl chloride hydrochloride are added with stirring. After it is stirrer for 10 min., the clear solution is transferred by vacuum through a polyethylene tube to a second 1 quart (0.946 l.) kettle, cooled in a bath of ice and water, which is equipped with a slower speed, cage stirrer. The reaction mixture is stirred 30 minutes at ice bath temperature, then is stirred 90 min. while being cooled with cold water. At this time 24.34 g. (0.33 mole) of lithium carbonate are added and stirring is continued 1 hr. The hazy, viscous dope is allowed to stand 70 hrs. in the closed, unstirred vessel at room temperature. A sample of the dope is combined with water to precipitate the polymer which is collected, washed with water and dried; the inherent viscosity of the poly(1,4-benzamide) is 1.35.

The very viscous dope is heated at 125° C. for about 4 hrs. with stirring until a smooth spinning dope is formed. Some TMU is allowed to evaporate in order to bring the polymer content of the dope to about 10% (wt. basis).

Part B

The procedure described above in Part A is repeated with the exception that aniline and benzoyl chloride are used as chain terminators instead of p-aminobenzoic acid. The aniline (0.49 ml., 0.0054 mole) is added at the beginning of the reaction. During the period after the lithium carbonate addition, the system becomes very difficulty stirrable. Benzoyl chloride (1.26 ml., 0.011 mole) is added 1 hr. after the lithium carbonate addition; mixing is continued for 10 more minutes. The reaction mixture is allowed to stand at room temperature for 20 hrs. A sample of the polymer isolated from the reaction mixture exhibits an inherent viscosity of 1.52.

The mixture is then heated and stirred as before with TMU evaporation occurring to yield a spinning dope containing about 10% by weight poly(1,4-benzamide).

EXAMPLE 2

This example illustrates the preparation of fibers from the spin dopes described in Examples 1–A and 1–B, above.

The spin dopes are extruded into fibers under the conditions shown in Table I below. Each dope is extruded through a heated spinneret into a heated drying column which is swept with a cocurrent stream of dry nitrogen whose temperature at entrance to the column is shown in the table. The emerging fibers are wet with water and detergent prior to windup. After the fibers are soaked in distilled water on bobbins until essentially free of salt, they are dried in air. Samples of the fibers are boiled off and dried before their tensile properties are measured and before they are subjected to heat treatment.

TABLE I.—CONDITIONS FOR SPINNING POLY(1,4-BENZAMIDE) DOPES

| Spinning variable | Spin "A" Dope from Ex. 1–A | Spin "B" Dope from Ex. 1–B |
|---|---|---|
| Adapter temperature, °C | 110 | 110 |
| Head temperature, °C | 100 | 100 |
| Dope extrusion rate, ml./min | 2.9 | 2.9 |
| Spinneret: | | |
| Holes | 5 | 5 |
| Hole diameter: | | |
| Inch | 0.005 | 0.005 |
| Centimeter | 0.0127 | 0.0127 |
| Temperature, °C | 130 | 123 |
| Nitrogen temperature, °C | 175 | 183 |
| Nitrogen flow: | | |
| Ft.³/min | 4 | 4 |
| M.³/min | 0.114 | 0.114 |
| Yarn wind-up speed: | | |
| Yd./min | 118 | 131 |
| M./min | 108 | 120 |

EXAMPLE 3

This example summarizes the tensile and other properties exhibited by the fibers extruded as shown in Example 2, above. The as-extruded properties are obtained on fiber which is boiled off and dried before testing. Drawing and heating of the as-extruded fiber in the previously described apparatus is accomplished under the conditions shown in the table.

The results shown in Table II illustrate that poly(1,4-benzamide) fiber terminated with p-aminobenzoic acid exhibits unexpectedly large gains in inherent viscosity, tenacity, and initial modulus after heat treatments in contrast to the gains shown by fibers of the polymer terminated with aniline and benzoyl chloride.

TABLE II.—PROPERTIES OF TERMINATED POLY(1,4-BENZAMIDE) FIBERS

| Fiber treatment | Fiber from Spin "A" | | | | | Fiber from Spin "B" | | | | |
| --- | --- | --- | --- | --- | --- | --- | --- | --- | --- | --- |
| | T | E | Mi | Den. | ηinh | T | E | Mi | Den. | ηinh |
| As-extruded | 6.61 | 2.8 | 344 | 4.35 | 1.56 | 6.08 | 2.8 | 294 | 5.04 | 1.62 |
| Drawn 1.02× at 540° C | 13.2 | 1.7 | 858 | 3.84 | 2.19 | 10.5 | 1.5 | 798 | 4.31 | 1.67 |
| Drawn 1.02× at 560° C | 15.1 | 1.8 | 960 | 3.87 | 2.26 | 10.5 | 1.5 | 785 | 4.13 | 1.76 |
| Drawn 1.02× at 580° C | 15.7 | 1.8 | 1,005 | 3.66 | 2.56 | 10.4 | 1.2 | 931 | 3.94 | 1.78 |

EXAMPLE 4

This example illustrates (1) preparation of poly(1,4-benzamide) terminated with Formula II terminators and (2) preparation from the polymers of high strength fibers.

Part A

To a stirred solution of 0.5 g. (0.0029 mole) 4-amino-2-chlorobenzoic acid in 200 ml. of ice-cooled TMU are added 32.9 g. (0.167 mole) of p-aminobenzoyl chloride hydrochloride. The ice bath is removed after 15 minutes and stirring is continued for 2 hrs. after addition of the monomer. Lithium hydroxide monohydrate (12.8 g., 0.305 mole) is then added to the reaction mixture which is further stirred (1–2 hr.) before being permitted to stand overnight. A small portion of the reaction mixture is combined with water to precipitate the polymer which, after being collected, washed, and dried, exhibits an inherent viscosity of 1.10.

After the reaction mixture is stored for 23 days, it is heated for several hours at 125° C. (water and TMU are distilled from the mixture) to form a spin dope which contains about 10% by weight polymer. The spin dope, maintained at about 100° C., is extruded at 90 lb./in.$^2$ (6.2 kg./cm.$^2$) through a 5-hole spinneret (maintained at about 110° C.) having holes of 0.005 in. (0.0127 cm.) diameter, each, into a drying column maintained between about 198–207° C. and which is swept with a cocurrent stream of dry nitrogen (5 ft.$^3$/min., 0.142 m.$^3$/min.) which enters the column at 250° C. The fibers are wet with water and detergent and are wound up at 100 yd./min. (91 m./min.) The fibers, after being washed and dried, exhibit the following tensile properties: T/E/Mi/Den.: 4.65/1.3/409/5.58.

Part B

The synthesis procedure of Part A, above, is repeated with the exception that 0.5 g. (0.0023 mole) of 4-(4-aminophenyl)benzoic acid is used as the terminator. A sample of the poly(1,4-benzamide) obtained exhibits an inherent viscosity of 1.25.

After the reaction mixture is stored for 10 days, it is heated for several hours at 125° C. (water and TMU are distilled from the mixture) to form a spin dope which contains about 10% by weight polymer. The spin dope is extruded at 70 lb./in.$^2$ (4.92 kg./cm.$^2$) through a 5-hole spinneret (maintained at about 129° C.) having holes of 0.005 in. (0.0127 cm.) diameter, each, into a drying column maintained between about 200–204° C. and which is swept with a cocurrent stream (4.75 ft.$^3$/min., 0.135 m.$^3$/min.) of dry nitrogen which enters the column at about 282° C. The fibers are wet with water and detergent and are wound up at about 100 yd./min. (91 m./min.). The fibers, after being washed and dried, exhibit the following tensile properties: T/E/Mi/Den.: 5.12/1.4/382/4.00.

Part C

The synthesis procedure of Part A, above, is repeated with the exception that 0.38 g. (0.0025 mole) of 4-aminophenylacetic acid is employed as the terminator. A sample of the poly(1,4-benzamide) obtained exhibits an inherent viscosity of 1.44.

After the reaction mixture is stored for 21 days, it is heated for several hours at 125° C. (water and TMU are distilled from the mixture) to form a spin dope which contains about 11% by weight polymer. The dope, maintained at about 100° C., is extruded at 100 lb./in.$^2$ (6.8 kg./cm.$^2$) through a 4-hole spinneret (maintained at about 109° C.) having holes of 0.005 in. (0.0127 cm.) diameter, each, into a drying column maintained between about 198–208° C. and which is swept with a cocurrent stream (5 ft.$^3$/min., 0.142 m.$^2$/min.) of dry nitrogen which enters the column at about 255° C. The fibers are wet with water and detergent and are wound up at 150 yd./min. (136.5 m./min.). The fibers, after being washed and dried, exhibit the following tensile properties: T/E/Mi/Den.: 6.01/1.9/400/4.4.

Part D

The synthesis procedure of Part A, above, is repeated with the exception that 0.46 g. (0.0025 mole) of 4-aminothiophenoxyacetic acid is used as the terminator. A sample of the poly(1,4-benzamide) exhibits an inherent viscosity of 1.24.

After the reaction mixture is stored for 22 days, it is heated for several hours at 125° C. (water and TMU distilled from the mixture) to form a spin dope which contains about 10% by weight polymer. This dope, maintained at about 90° C., is extruded at 50 lb./in.$^2$ (3.4 kg./cm.$^2$) through a 5-hole spinneret (maintained at 108° C.) having holes of 0.005 in. (0.0127 cm.) diameter, each, into a drying column maintained between about 197–207° C. and which is swept with a cocurrent stream (5 ft.$^3$/min., 0.142 m.$^3$/min.) which enters the column at about 250° C. The fibers are wet with water and detergent and are wound up at 124 yd./min. (113 m./min.). The fibers, after being washed and dried, exhibit the following tensile properties: T/E/Mi/Den.: 6:54/1.8/444/3.07.

Part E

The synthesis procedure of Part A, above, is repeated with the exception that 0.38 g. (0.0025 mole) of methyl 4-aminobenzoate is used as the terminator. In addition, the neutralized reaction mixture is permitted to stand 18 hours before a sample of the polymer is removed. A sample of the poly(1,4-benzamide) obtained exhibits an inherent viscosity of 1.50.

The reaction mixture is then heated (water and TMU are distilled from the mixture) to form a spin dope which contains about 12% by weight polymer. This dope, maintained at about 115° C., is extruded at 50 lbs./in.$^2$ (3.4 kg./cm.$^2$) through a 9-hole spinneret (maintained at about 134° C.) having holes of 0.005 in. (0.0127 cm.) diameter, each, into a drying column maintained between about 105–205° C. and which is swept with a co-current stream (4.75 ft.$^3$/min., 0.135 m.$^3$/min.) of dry nitrogen which enters the column at about 285° C. The fibers are wet with water and detergent and are wound up at 140 yd./min. (127 m./min). The fibers, after being washed and dried, exhibit the following tensile properties: T/E/Mi/Den.: 3.63/2.0/272/5.96.

Part F

The synthesis procedure of Part A, above, is repeated with the exception that 0.38 g. (0.0025 mole) of 4-hydrazinobenzoic acid is used as the terminator. A sample of the poly(1,4-benzamide) obtained exhibits an inherent viscosity of 1.34.

After the reaction mixture is stored for 2 days, it is heated several hours at 125° C. (water and TMU are distilled from the mixture) to form a spin dope which contains about 10% by weight polymer. This dope, maintained at about 125° C., is extruded at 120 lbs./in.$^2$ (8.16 kg./cm.$^2$) through a 5-hole spinneret (maintained at about 140° C.) having holes of 0.005 in. (0.0127 cm.) diameter, each, into a drying column maintained between 195–200° C. and which is swept with a cocurrent stream (4.5 ft.³/min., 0.128 m.³/min.) of dry nitrogen which enters the column at about 235° C. The fibers are wet with water and detergent and are; wound up at 200 yd./min. (182 m./min.). The fibers, after being washed and dried, exhibit the following tensile properties: T/E/Mi/Den.: 8.00/2.8/434/5.64.

Part G

The synthesis procedure of Part A, above, is repeated with the exception that 0.54 g. (0.0030 mole) of α-(4-aminophenyl) isobutyric acid is used as the terminator. A sample of the poly(1,4-benzamide) obtained exhibits an inherent viscosity of 1.57.

After the reaction mixture is stored for 2 days, it is heated and stirred for several hours (water and TMU are distilled from the mixture) to form a spin dope which contains about 10% by weight polymer. This dope, maintained at 115° C., is extruded at 50 lb./in.² (3.4 kg./cm.²) through 4 holes of a spinneret (maintained at about 119° C.), each hole being of 0.005 in. (0.0127 cm.) diameter, into a drying column which is maintained at about 198–204° C. and which is swept with a cocurrent stream (4.75 ft.³/min., 0.135 m.³/min.) which enters the column at about 220° C. The fibers are wet with water and detergent and are wound up at about 200 yd./min. (182 m./min.). The fibers, after being washed and dried, exhibit the following tensile properties: T/E/Mi/Den.: 7.42/2.5/417/5.48.

Part H

The synthesis procedure of Part E, above, is repeated with the exception that 0.53 g. (0.0025 mole) of phenyl 4-aminobenzoate is used as the terminator. A sample of the poly(1,4-benzamide) exhibits an inherent viscosity of 1.41.

After the reaction mixture is stored for 3 days, it is heated for several hours at 125° C. (water and TMU are distilled from the mixture) to form a spin dope which contains about 12% by weight polymer. The dope, maintained at about 100° C., is extruded at 80 lb./in.² (5.4 kg./cm.²) through a 5-hole spinneret (maintained at 122° C.) having holes of 0.005 in. (0.0127 cm.) diameter, each, into a drying column which is maintained at about 200–206° C. and which is swept with a cocurrent stream of dry nitrogen (5 ft.³/min., 0.142 m.³/min.) which enters the column at about 250° C. The fibers are wet with water and detergent and are wound up at about 165 yd./min. (150 m./min.). The fibers, after being washed and dried, exhibit the following tensile properties: T/E/Mi/Den.: 6.91/2.0/452/3.77.

Part I

The synthesis procedure of Part A, above, is repeated with the exception that 0.34 g. (0.0025 mole) of 3-aminobenzoic acid is used as the terminator. Also, the reaction mixture could be stirred for only 0.5 hr. after addition of the base because the mixture became too thick. A sample of the poly(1,4-benzamide) obtained exhibits an inherent viscosity of 1.48.

The reaction mixture is heated to 130° C. (water and TMU are distilled from the mixture) to form a spin dope which contains about 12% by weight polymer. This dope, maintained at about 120° C. is extruded through a 5-hole spinneret (maintained at about 130–135° C.) having holes of 0.005 in. (0.0127 cm.) diameter, each, into a drying column maintained between 200–216° C. and which is swept with a cocurrent stream (4.5 ft.³/min., 0.128 m.³/min.) of dry nitrogen which enters the column at about 270° C. The fibers are wet with water and detergent and are wound up at about 185 yd./min. (168 m./min.). The fibers after being washed and dried, exhibit the following tensile properties: T/E/Mi/Den.: 6.12/2.3/380/4.52.

EXAMPLE 5

This example illustrates that the chain-terminated poly-(1,4-benzamide) fibers whose preparations are shown in Example 4 undergo significant gains in inherent viscosity and tensile properties during post-extrusion heat treatments.

Separate samples of the fibers described in Example 4 are given heat treatments in the apparatus described earlier; for one treatment the center of the tube is heated to 500° C.; for the other, the center is at 540° C. Fiber samples are drawn 1.02× during each treatment. Fiber properties after heat treatments (labeled "500° C." and "540° C.," respectively) are summarized in Table III which also includes original properties for reference.

EXAMPLE 6

This example provides further illustration of the use of methyl 4-aminobenzoate as a terminator.

The synthesis procedure of Example 4A is repeated with the exception that 0.38 g. (0.0025 mole) of methyl 4-aminobenzoate is used as the terminator. A sample of the poly(1,4-benzamide) obtained from the reaction mixture, which is permitted to stand about 65 hours, exhibits an inherent viscosity of 1.07. After the reaction mixture is stored for 14 days, it is heated (water and TMU are distilled from the mixture) to form a spin dope which contains about 12% by weight polymer. This dope is extruded into a drying column by a procedure similar to that shown throughout Example 4 and the fibers are wound up at 170 yd./min. (154 m./min.). The fibers, after being washed and dried, exhibit the following tensile properties: T/E/Mi/Den.: 4.00/1.3/380/2.89. After these fibers are drawn 1.02× at 500° C. by the previously described procedure, the following tensile properties are exhibited: T/E/Mi/Den.: 13.5/1.7/750/2.54.

TABLE III.—FIBER PROPERTIES AFTER HEAT TREATMENT

| Fiber of Example 4 | $\eta$inh of polymer | Original properties | | | | Properties after treatment at— | | | | | | | | |
| --- | --- | --- | --- | --- | --- | --- | --- | --- | --- | --- | --- | --- | --- | --- |
| | | | | | | 500° C. | | | | 540° C. | | | | |
| | | T | E | Mi | Den. | $\eta$inh | T | E | Mi | Den. | $\eta$inh | T | E | Mi | Den. |
| A | 1.10 | 4.65 | 1.3 | 409 | 5.56 | 1.76 | 10.5 | 1.3 | 916 | 5.86 | 3.32 | 11.9 | 1.4 | 942 | 6.11 |
| B | 1.25 | 51.2 | 1.4 | 382 | 4.00 | 1.92 | 9.76 | 1.4 | 726 | 2.86 | 3.24 | 11.9 | 1.6 | 793 | 3.18 |
| C | 1.44 | 6.01 | 1.9 | 400 | 4.41 | 2.25 | 13.2 | 2.1 | 721 | 3.30 | 3.42 | 9.02 | 1.0 | 982 | 4.26 |
| D | 1.24 | 6.54 | 1.8 | 444 | 3.07 | 2.24 | 10.2 | 1.5 | 755 | 2.81 | 3.15 | 12.1 | 1.4 | 900 | 3.38 |
| E | 1.50 | 3.63 | 2.0 | 272 | 5.96 | | 7.05 | 1.7 | 490 | 4.48 | 3.13 | 8.68 | 1.7 | 578 | 4.30 |
| F | 1.34 | 8.00 | 2.8 | 434 | 5.64 | 1.90 | 13.4 | 1.6 | 942 | 4.71 | 3.22 | 11.9 | 1.5 | 813 | 3.45 |
| G | 1.57 | 7.42 | 2.5 | 417 | 5.48 | 1.86 | 11.7 | 1.6 | 750 | 2.94 | 2.98 | 11.3 | 1.6 | 799 | 2.93 |
| H | 1.41 | 6.91 | 2.0 | 452 | 3.77 | 1.93 | 13.2 | 1.6 | 933 | 4.71 | 3.74 | 11.6 | 1.3 | 964 | 4.76 |
| I | 1.48 | 6.12 | 2.3 | 380 | 4.52 | 2.04 | 13.7 | 1.6 | 945 | 3.78 | 2.92 | 15.7 | 1.8 | 1,010 | 3.61 |

EXAMPLE 7

This example illustrates a polyamide synthesis which employs an amine diacid as a terminator and the preparation of improved fibers from the polymer.

The synthesis procedure of Example 4A is repeated with the exception that 0.45 g. (0.0025 mole) of 5-aminoisophthalic acid is used as the terminator and 12.15 g. (0.164 mole) of lithium carbonate are used as the lithium chloride forming agent. The mixture is heated (water and TMU are distilled from the mixture) and stirred at 125° C. to form a spin dope which contains about 10% by weight polymer. A sample of polymer isolated from the dope exhibits an inherent viscosity of 1.44. The dope is extruded into a drying column by a procedure similar to that shown throughout Example 4 and the fibers are wound up at 170 yd./min. (154 m./min.). The fibers, after being washed and dried, exhibit the following tensile properties: T/E/Mi/Den.: 6.29/2.4/372/4.37. After these fibers are drawn 1.02× at 542° C. by the previously described procedure, they exhibit the following tensile properties: T/E/Mi/Den.: 13.5/1.6/885/3.19.

EXAMPLE 8

This example illustrates use of a terminator in a copolymer preparation.

In a procedure similar to those preceding, 0.118 g. (0.00086 mole) of p-aminobenzoic acid is dissolved in 40 ml. of TMU in a glass flask equipped with a stirrer and blanketed with dry nitrogen. The system is cooled with solid carbon dioxide and a mixture of 6.08 g. (0.0316 mole) of p-aminobenzoyl chloride hydrochloride and 0.32 g. (0.0016 mole) of m-aminobenzoyl chloride hydrochloride is added with stirring. The cooling bath is removed and a clear viscous dope quickly forms. After 2 hr., 2.44 g. (0.033 mole) of lithium carbonate and 5 ml. of TMU are added. After being thoroughly mixed the polymerization system is allowed to stand at room temperature for seventy hours. The polymer, isolated by precipitation in water, is washed and dried and exhibits an inherent viscosity of 0.94.

EXAMPLE 9

This example illustrates use of a terminator in another copolymer preparation.

In a procedure similar to those preceding, 0.118 g. (0.00086 mole) of p-aminobenzoic acid and 0.432 g. (0.004 mole) of p-phenylenediamine are dissolved in 40 ml. of TMU in a glass flask equipped with a stirrer and blanketed with dry nitrogen. The system is cooled with ice-water mixture and 6.16 g. (0.032 mole) of p-aminobenzoyl chloride hydrochloride are added, with stirring. One minute later, 0.816 g. (0.004 mole) of terephthaloyl chloride is added. At 10 minutes the ice-water bath is removed; stirring is continued. At 2 hr., 2.44 g. (0.033 mole) of lithium carbonate are added. The system is then stirred one hour and allowed to stand 18 hours at room temperature. The polymer, isolated by precipitation in water, is washed and dried, and exhibits an inherent viscosity of 1.21.

EXAMPLE 10

This example illustrates the use of a dipeptide as a chain terminator.

A poly(1,4-benzamide)homopolymer is prepared by a procedure similar to that of Example 8 except that 0.118 g. (0.00086 mole) of 4-(4-aminobenzamido)benzoic acid is used with 6.4 g. (0.033 mole) p-aminobenzoyl chloride hydrochloride. The reaction mixture is permitted to stand at room temperature for 18 hours. The inherent viscosity of the washed and dried polymeric product, isolated by above-described procedures, is 1.32.

EXAMPLE 11

This example illustrates the use of an aminoacid salt as a chain terminator.

A poly(1,4-benzamide) homopolymer is prepared by a procedure similar to that of Example 9 except that 0.0006 mole of the lithium salt of p-aminobenzoic acid (prepared by evaporating to dryness from water solution equivalents of lithium hydroxide and the aminoacid) is used as the terminator with 0.0333 mole of p-aminobenzoyl chloride hydrochloride. The inherent viscosity of the polymer obtained is 1.07.

EXAMPLE 12

This example illustrates the preparation of fibers from a sample of an isolated polymer which is terminated according to this invention.

A sample of poly(1,4-benzamide) is prepared from p-aminobenzoyl chloride hydrochloride by a procedure like those preceding, using 200 ml. of TMU, 0.37 g. (0.0027 mole) of p-aminobenzoic acid as a terminator, and 12.17 g. of lithium carbonate. The washed and dried polymer weighs 21.55 g. and exhibits an inherent viscosity of 1.49.

Twenty grams of the above-described polymer, powdered, is combined with 168.3 g. of TMU containing 11.7 g. of dissolved lithium chloride in a glass vessel equipped with a stirrer and closed so as to exclude moist air and retain solvent, but which permits equilibration of pressures during the following cycles. The stirred system is heated with an oil bath at 125° C. for 48 hours, cooled with solid carbon dioxide for 2 hours, heated at 125° for 24 hours, cooled with solid carbon dioxide for 4 hours, and heated at 125° for 24 hours. At the end of this treatment, the smooth, viscous dope which is obtained is dry spun under the following conditions:

Spinneret _____ 5 holes each of 0.005 in. (0.0127 cm.) diameter; temperature is 129–130° C.
Dope extrusion rate, ml./min. __
Column temp. ___ 2.9
N₂ flow rate _____ 188–217° C.
Temperature ____ 4.5 cu. ft./min. (0.128 m.³/min.)
Yarn wind-up speed _____ 152–156° C.
153 yd./min. (140 m./min.)

The washed and dried fiber has the following physical properties: T/E/Mi/Den.=5.9/4.3/305/4.7 (boil-off treatment is not utilized). The heat treated fiber has T/E/Mi/Den.=11.2/2/.0/610/3.9.

EXAMPLE 13

This example illustrates the preparation of poly(1,4-benzamide) in N,N-dimethylacetamide, the use of 4-aminobenzoic acid as a terminator, and wet-spinning of the directly prepared dope to yield high tenacity fibers.

In a 1-liter resin kettle, dried by flaming and equipped for stirring and blanketing with a nitrogen atmosphere, is placed a solution of 0.069 g. of 4-aminobenzoic acid in 175 ml. of dry N,N-dimethylacetamide. The system is cooled with solid "Dry Ice" and 24 g. of solid p-aminobenzoyl chloride hydrochloride is added with stirring. After 15 minutes, the cooling bath is removed and stirring is continued at autogenous temperature for 1.75 hours. Lithium carbonate (9.12 g.) as a slurry in 25 ml. N,N-dimethylacetamide is added and there soon results a smooth-flowing, moderately-viscous, dope. At three hours a sample of the polymer is isolated by precipitation in water and, after being washed and dried, has an inherent viscosity of 1.87.

After about an hour of resting, the dope is formed into fibers by extrusion from a stainless steel cell through a 20-hole spinneret, each hole having a 0.003 inch (0.076 mm.) diameter, into a water bath at 70–80° C. The wind-up rate is 72 ft./min. (22 m./min.).

The as-extruded fiber, washed and dried, has T/E/Mi/Den./η_inh=8.1/7.5/436/1.41/1.83. Fibers drawn 1.02× at 540° C. and 560° C. have T/E/Mi/Den./η_inh= 20.5/2.4/961/1.24/2.62 and 21.1/2.3/994/1.19/2.95, respectively.

What is claimed is:
1. In a process for preparing a fiber forming polycarbonamide characterized by at least about 80 mol percent of recuring units of the Formula I:

(I) 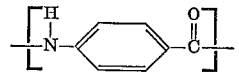

by the low temperature solution polymerization of p-aminobenzoyl halide salts of Formula III:

(III) 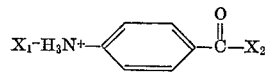

wherein $X_1$ represents a member selected from the group consisting of arylsulfonate, alkylsulfonate, acid sulfate and halogen radicals and $X_2$ represents a halogen radical, the improvement comprising adding, during the polymer preparation, at least one compound of Formula II:

(II) 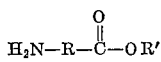

wherein R is a divalent radical nonreactive in the polymerization and comprised of from 6 to 20 carbon atoms and containing at least one phenylene ring which may bear one or more substituents and wherein R' is selected from the group consisting of hydrogen, lower alkyl radicals and aryl radicals which may bear substituents nonreactive in the polymerization, said compound of Formula II being added in an amount from about 0.1 to 3.0 mol percent based upon the amount of monomeric precursors of the polymer.

2. Process of claim 1 wherein said mol percent is about 0.5 to 2.0.

3. Process of claim 1 wherein said compound of Formula II is added at the start of the polymerization.

4. Process of claim 1 wherein said compound of Formula II is added during the polymerization.

5. Process of claim 1 wherein said compound of Formula II is p-aminobenzoic acid.

References Cited

UNITED STATES PATENTS

| 2,356,516 | 8/1944 | Hagedorn | 260—78 |
| 2,688,011 | 8/1954 | Wheatley et al. | 260—78 |
| 3,408,334 | 10/1968 | Caldwell et al. | 260—78 |
| 3,509,105 | 4/1970 | Pedersen | 260—78 |

OTHER REFERENCES

Colonge et al. Societe Chimique de France, Bulletin T22, June 1955, pp. 412–419.

HAROLD D. ANDERSON, Primary Examiner

U.S. Cl. X.R.

260—32.6 N, 470 Z, 63 N, 78 TF